(12) United States Patent
Stuy et al.

(10) Patent No.: US 7,970,787 B2
(45) Date of Patent: Jun. 28, 2011

(54) ACCESS CONCURRENCY FOR CACHED AUTHORIZATION INFORMATION IN RELATIONAL DATABASE SYSTEMS

(75) Inventors: Michael A. F. Stuy, Unionville (CA); Paul M. Bird, Unionville (CA)

(73) Assignee: International Business Machines Corporation, Armonk, NY (US)

( * ) Notice: Subject to any disclaimer, the term of this patent is extended or adjusted under 35 U.S.C. 154(b) by 1317 days.

(21) Appl. No.: 10/391,118

(22) Filed: Mar. 17, 2003

(65) Prior Publication Data

US 2003/0204504 A1 Oct. 30, 2003

(30) Foreign Application Priority Data

Apr. 29, 2002 (CA) ..................................... 2384259

(51) Int. Cl.
G06F 7/00 (2006.01)
G06F 17/30 (2006.01)
(52) U.S. Cl. ...................................................... 707/781
(58) Field of Classification Search ................... 707/10, 707/781; 711/118, 123
See application file for complete search history.

(56) References Cited

U.S. PATENT DOCUMENTS

| | | | |
|---|---|---|---|
| 5,230,070 A | 7/1993 | Liu | |
| 5,608,909 A * | 3/1997 | Atkinson et al. | 719/315 |
| 5,864,854 A * | 1/1999 | Boyle | 707/10 |
| 5,897,634 A * | 4/1999 | Attaluri et al. | 1/1 |
| 5,930,794 A * | 7/1999 | Linenbach et al. | 707/100 |
| 6,016,495 A | 1/2000 | McKechan et al. | |
| 6,138,209 A | 10/2000 | Krolak et al. | |
| 6,243,719 B1 | 6/2001 | Ikuta et al. | |
| 6,263,369 B1 | 7/2001 | Sitaraman et al. | |
| 6,321,235 B1 * | 11/2001 | Bird | 707/203 |
| 2001/0051956 A1 * | 12/2001 | Bird | 707/203 |
| 2002/0026448 A1 * | 2/2002 | Bird et al. | 707/104.1 |
| 2002/0091899 A1 * | 7/2002 | Weedon | 711/118 |

FOREIGN PATENT DOCUMENTS

WO 9744747 11/1997

OTHER PUBLICATIONS

Boykin, R. J. "Support of Column Privileges in SQL". Sep. 1992., pp. 80-81. IBM Technical Disclosure Bulletin. vol. 35 No. 4A.*
Provided are www.google.com web definitions of the word Cache. Accessed Dec. 7, 2006.*
"Using 'defunct' Cache Entries to Avoid Artificial Deadlocks when Caching Catalog Tables," IBM Research Disclosure. Jun. 2001. pp. 1089-1090.
Myer, Andy et al., "A Secure, Publisher-Centric Web Caching Infrastructure," Dept of Electr. & Comp. Eng., Carnegie Mellon University, Pittsburg, PA, pp. 1-26, Apr. 26, 2001.

* cited by examiner

Primary Examiner — John R. Cottingham
Assistant Examiner — Michael Pham
(74) Attorney, Agent, or Firm — Sawyer Law Group, P.C.

(57) ABSTRACT

A method and system for improving access concurrency to information stored in at least one table in a relational database system is disclosed. The method comprises providing a data cache, which stores a portion of the at least one table. The data cache includes a plurality of cache entries, wherein each cache entry comprises a first data item, a second data item, and a cache entry state. The method further comprises retrieving from the at least one table and storing in a cache entry's first data item a representation of committed information for a user, and retrieving from the at least one table and storing in the cache entry's second data item a representation of changes applied to the committed information, but not yet committed in the database system.

25 Claims, 2 Drawing Sheets

ACCESS CONCURRENCY FOR CACHED AUTHORIZATION INFORMATION IN RELATIONAL DATABASE SYSTEMS

CROSS-REFERENCE TO RELATED APPLICATIONS

This application claims benefit under 35 USC §119 of Canadian Application No. 2,384,259, filed on Apr. 29, 2002.

FIELD OF THE INVENTION

The present invention is directed to an improvement in computing systems and in particular to an improvement in access concurrency for cached authorization information in relational database systems.

BACKGROUND OF THE INVENTION

Relational database systems typically permit access to the database to be managed. Such systems often include authorization and privilege information in the system catalog tables maintained by the system. Appropriate rows in the system catalog tables will be accessed to determine the authorization and privilege settings that apply for a given operation and user. These catalog table rows contain a representation of the authorizations. The catalog table typically has a field for each authorization and either have Y or N in the field for the row. Each row is unique based on the authorization grantor, grantee, and type of grantee (user or group).

For efficiency reasons, relational database systems often include a cache to provide fast access to repeatedly accessed information or data. The authorization and privilege information that is kept in the system catalog tables is a candidate for caching in such a system.

In concurrent database systems, it is also necessary to serialize access to data and information to prevent inconsistencies from arising due to race conditions. Thus, in such systems, where the authorizations and privileges stored in system catalog tables (and potentially copied into caches for such tables) are undergoing maintenance, access to the information is restricted to the database agent that is carrying out the maintenance, to avoid concurrency problems. Exclusive control is typically obtained by the maintenance application as the maintenance operation is carried out on the specific authorization or privilege information. In an SQL relational database system, authorization and privilege maintenance is carried out by an application invoking one of the two statements GRANT or REVOKE.

The result of granting exclusive control to the application invoking a GRANT or REVOKE statement is that other applications are unable to read the information until the maintenance process in question is committed and exclusive control is released by the maintenance application. Other applications requesting the authorization or privilege information are required to wait during the time that the maintenance operation is being carried out.

Where the authorization and privilege information is copied into a cache in memory, the cache access mimics the non-cached exclusive access. Exclusive control of the relevant cache information is therefore typically provided to the agent carrying out the maintenance operation. Such an approach will ensure that for both cached and uncached data, the access will be consistent. However, this exclusive control approach results in potential delays for other requesters that must wait for the exclusive control of the maintenance process to be relinquished before the cached authorization or privilege information may be accessed.

It is therefore desirable to provide for improved access to cached authorization or privilege information without requiring all requesting applications to wait on the completion of maintenance operations.

SUMMARY OF THE INVENTION

The present invention is directed to a method and system for improving access concurrency to information stored in at least one table in a relational database system. The method comprises providing a data cache, which stores a portion of the at least one table. The data cache includes a plurality of cache entries, wherein each cache entry comprises a first data item, a second data item, and a cache entry state. The method further comprises retrieving from the at least one table and storing in a cache entry's first data item a representation of committed information for a user, and retrieving from the at least one table and storing in the cache entry's second data item a representation of changes applied to the committed information, but not yet committed in the database system.

According to an aspect of the present invention there is provided an improved method and system for increasing access concurrency for cached authorization or privilege information during maintenance activity.

According to another aspect of the present invention there is provided a cache having cache entries. Each entry represents authorization information for a grantee by an authorization data item and a cumulative delta data item. The authorization data item represents committed authorizations. The cumulative delta data item represents authorization changes as applied to the committed authorizations but not yet committed. Access to either the authorization or cumulative delta data items from the cache entry will depend on the requesting agent and on the cache entry state.

According to another aspect of the present invention there is provided a computer program product including a computer usable medium tangibly embodying computer readable program code means for implementation in a database system, the database system supporting the execution of database control statements granting and revoking of authorizations to users and supporting concurrent processing, the computer readable program code means including code means for defining and maintaining a data cache for authorization information for users of the database system, the data cache including cache entries having a cache entry data structure, the cache entry data structure including an authorization data item, a cumulative delta data item and a cache entry state, the authorization data item including a representation of authorization information for a user, the cumulative delta data item including a representation of changes applied to the authorization information for the user made by the execution of a grant statement or a revoke statement prior to the statement being committed in the database system.

According to another aspect of the present invention there is provided the above computer program product, the database system including agents for executing database control statements, the computer program product further including code means for permitting an agent executing a requesting database control statement to access either the authorization data item or the cumulative delta data item for a selected cache entry data structure, the access being permitted based on the cache entry state for the cache entry and on the requesting database control statement.

According to another aspect of the present invention there is provided the above computer program product further including code means for permitting the agent to access the cumulative delta data item for the cache entry in the case when the agent requesting the access is itself executing a statement modifying the authorization information for the user that is stored in the cache entry.

According to another aspect of the present invention there is provided the above computer program product further including code means for permitting the agent to access the authorization data item for the cache entry in the case when the cache entry state specifies that the cache entry is subject to a grant statement operation and the requesting database control statement does not modify the authorization information.

According to another aspect of the present invention there is provided the above computer program product in which the authorization data item is a consolidated representation of authorization information, for a unique grantee and grantee type pair, stored in system catalog tables in the database system.

According to another aspect of the present invention there is provided the above computer program product in which the cache entry state is selected to correspond to one of the group of VALID, VALID_RSVD, NOT_LOADED, NOT_LOADED_RSVD, and NOT_LOADED_GRIP.

According to another aspect of the present invention there is provided the above computer program product in which the authorization data item is a bitmap and the cumulative delta data item is a bitmap.

According to another aspect of the present invention there is provided the above computer program product in which the database system is an SQL database system and the database control statements are SQL statements.

Advantages of the present invention include a method and system that permits access to cached authorization and privilege information, under certain conditions, during authorization maintenance activity.

BRIEF DESCRIPTION OF THE DRAWINGS

The preferred embodiment of the invention is shown in the drawings, wherein.

Figure 1:
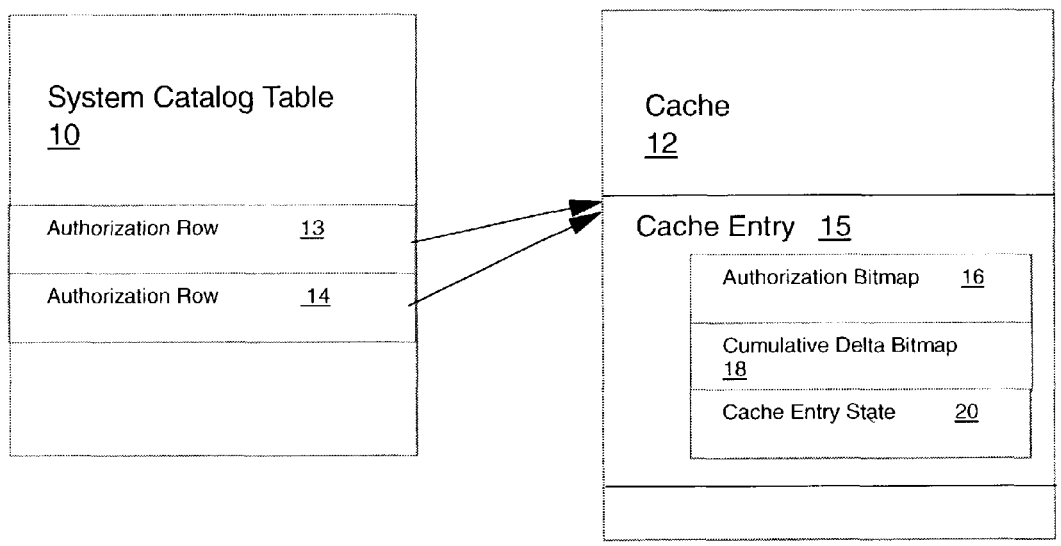
FIG. 1 is a block diagram illustrating an example representation of authorization information in accordance with the preferred embodiment.

In the drawings, the preferred embodiment of the invention is illustrated by way of example. It is to be expressly understood that the description and drawings are only for the purpose of illustration and as an aid to understanding, and are not intended as a definition of the limits of the invention.

DETAILED DESCRIPTION

FIG. 1 shows, in block diagram format, a representation of a portion of a database system utilizing the approach of the preferred embodiment. The database system is a transaction-based relational database system supporting concurrent access in which operations are carried out by agents. In the example of FIG. 1, system catalog table 10 and cache 12 are shown. System catalog table 10 contains authorization information pertaining to an example database (in this description, authorization information will include privilege information, as necessary). Each row in table 10 contains information relating to authorization or privilege information or both. FIG. 1 shows example authorization rows 13, 14 in table 10.

In the preferred embodiment, as is the case in prior art database systems, authorization information in system catalog tables (such as table 10, shown in FIG. 1), is able to be copied to a cache (shown as cache 12) in memory to provide for faster access to repeatedly accessed information. In the approach of the preferred embodiment, the authorization information in the cache is defined so as to permit efficient access to such information.

The arrangement and operation of the cache of preferred embodiment is shown by the example of FIG. 1 and in particular with reference to authorization rows 13, 14 in table 10. As is shown in FIG. 1, the information in rows 13, 14 in table 10 is represented in cache entry 15 in cache 12. The copied values from authorization rows 13, 14 are shown as authorization bitmap 16 in cache 12. It will be appreciated by those skilled in the art that a data representation other than a bitmap may be used; a bitmap is selected for the cache representation as the memory requirements are reduced with this representation. Other data representations may be used in the cache where the design of the system permits. For example, a character representation corresponding to the system catalog table representation may be used. Alternatively, a numeric representation of the user authorizations may be stored in the cache.

The preferred embodiment provides for the consolidation of authorization information in cache 12. In the preferred embodiment, each row of authorization information in the system catalog tables (table 10 in FIG. 1) contains information identifying the grantor, the grantee, and the type of grantee for the authorizations defined in the row. In cache 12, however, authorization information is stored with reference to grantee and type of grantee, only. Further, cache entries consolidate all authorizations for a unique grantee and grantee type for all grantors. This consolidation is performed to ensure that the cache contains all authorizations for a grantee having a particular grantee type. This consolidation is shown in FIG. 1 where both rows 13 and 14 in table 10 are shown as being consolidated to cache entry 15 in cache 12.

As will be appreciated, cache 12 as represented in FIG. 1 is a data structure in a fast-access memory in the computer implementing the database system. Such a database system will typically have one or more caches used to store representations of different information that may be repeatedly required by the system. The preferred embodiment is described with reference to that aspect of the cache that maintains a copy of portions of a system catalog authorization table.

In the preferred embodiment, cache 12 includes a cumulative delta bitmap 18 that is associated with the authorization bitmap 16. Each cache entry has this pair-wise arrangement of authorization information. The first part of the pair is the committed authorization information (the authorization information resulting from committed transactions in the transaction-based database system, authorization bitmap 16). The second part of the pair is the cumulative delta bitmap 18 that is intended to contain the committed authorizations as modified by the application of uncommitted authorizations.

The database system of the preferred embodiment supports access by multiple applications and therefore includes lock mechanisms to ensure properly serialized access to data and information stored in the database system, such as the system catalog tables and cached tables relating to authorization information. Such lock mechanisms are known to those skilled in the art.

In the preferred embodiment, there are two types of SQL statements that are available to allow a user to define and change authorization information: the REVOKE statement and the GRANT statement. The GRANT statement permits a user (typically the database administrator) to set values in the system catalog tables to allow a specific database user or users to have certain defined access to data; the REVOKE statement is used to change system catalog values to preclude such access.

With a REVOKE statement, cache entry access is restricted (i.e. allowed only by the agent carrying out the REVOKE statement) as soon as the statement is executed. All specified authorizations are revoked regardless of the GRANTOR as soon as the REVOKE is issued and to carry out this maintenance all rows in the system catalog tables, and in the cache, for the GRANTEE are locked and access is restricted. With a GRANT statement, only the row for the GRANTOR, GRANTEE combination in the system catalog table is locked. In the cache, as is described in more detail below, for GRANT statements the preferred embodiment allows access to the committed authorization information by other agents.

The processing of a GRANT statement or of a REVOKE statement will therefore result in the agent executing the statement obtaining a lock on the rows in the affected system catalog tables. In the example of FIG. 1, if a GRANT or REVOKE accesses row 13, the application invoking the statement will obtain an exclusive lock for row 13 before the access is made. As described above, for the execution of a REVOKE statement, the agent will also obtain exclusive control of the relevant cache entry (authorization bitmaps 16 and 18, in cache 12).

The agent for an application that issues a GRANT statement does obtain exclusive control of the cache entry (no other agent may modify the cache entry) in the database system of the preferred embodiment. However, as is described in further detail below, during the processing of the GRANT statement, but before the unit of work containing the statement is committed in the database system, other agents are able to access the cache to read the committed authorization bitmap (authorization bitmap 16 in the example of FIG. 1). However, other applications that seek to issue other GRANT or REVOKE statements that modify the same cache entry will be required to wait until the control of the entry is relinquished by the application first issuing the GRANT statement.

The distinction between the exclusive control obtained by a REVOKE operation and control obtained by a GRANT operation is achieved by each cache entry having a defined state. The state of a cache entry is used to determine how cache entry information will be provided to an application seeking to read a cache entry. The possible cache entry states and the manner in which cache entry information is presented to an application seeking to read the cache information, are set out below.

In the preferred embodiment, each cache entry 15 has a data structure that includes the authorization bitmap 16, the cumulative delta bitmap 18, entry type identifier, and an entry state identifier, as well as other identifiers used to identify the cache entry (for example, the grantee and type of grantee) and to permit cache operations to be carried out on the entry (for example pointers to entries in a least recently used list). Cache entry state 20 is shown in cache entry 15 in the example of FIG. 1 (other aspects of the cache entry data structure are not shown in FIG. 1). In the preferred embodiment, the defined cache entry states reflect whether the cache entry is loaded, whether there is a grant or revoke in progress and whether the cache entry is in a "reserved" state. The states defined in the preferred embodiment are valid, valid reserved, not loaded, not loaded reserved, and not loaded with a grant or revoke in process. The description of the preferred embodiment uses abbreviations of these states as follows: VALID, VALID_RSVD, NOT_LOADED, NOT_LOADED_RSVD, NOT_LOADED_GRIP. The following sets out the meaning of these cache entry states.

A VALID state indicates that the cache entry information has been loaded and is not the target of a GRANT or REVOKE statement. When a row in the cache has a VALID state, any application may read and use the information contained in the cache entry.

When a cache entry 15 has a VALID_RSVD state, both authorization 16 and cumulative delta bitmap 18 information are found in the cache entry 15. The state indicates that the authorization information is present and that there has been an uncommitted GRANT operation executed or in execution. A cache entry having a VALID state is modified to show a VALID_RSVD state when a GRANT operation is commenced.

When a cache entry 15 has a VALID_RSVD state and the same application that issued the GRANT seeks to read the cache entry data, the cumulative delta bitmap (cumulative delta 18) information is provided to the application. Other applications may also seek to read that cache entry. In such cases, the system of the preferred embodiment provides the authorization information in the authorization bitmap (authorization bitmap 16) found in the cache entry.

In this way, the application issuing the GRANT statement is provided with the updated authorization information (the cumulative delta bitmap 18). Other applications are also able to access authorization information related to the cache entry. For these applications, the information is the authorization bitmap 16 component of the cache entry 15. These other applications are provided with authorization information 16 without having to wait for the unit of work of the first application (issuing the GRANT) to have been committed.

When a cache entry 15 has a NOT_LOADED state, it has neither authorization nor cumulative delta information loaded. A cache entry may be in this state if it was created but the bitmap information not loaded, or after the COMMIT or ROLLBACK of a GRANT or REVOKE operation. If an application seeks to read a cache entry having a NOT_LOADED state, the preferred embodiment requires the application to obtain a loading lock for the cache entry and to have the cache entry loaded from the system catalog tables 10. After the loading lock is obtained, and the information loaded, the cache entry state will be defined to be VALID and the authorization bitmap information 16 will be returned to the reading application.

When a cache entry 15 has a NOT_LOADED_GRIP state, it has neither authorization 16 nor cumulative delta 18 information loaded, but indicates that a GRANT or REVOKE is in progress. When a cache entry 15 is being read and it has a NOT_LOADED_GRIP state, the application seeking to read the cache entry 15 will carry out a test on the loading lock on the cache entry 15. If the cache entry 15 is locked by another application, then the reading application will be required to wait on the loading lock. If the loading lock is held by the reading application, the application will cause the cache entry 15 values to be loaded from the system catalog tables 10. The agent will load the cumulative delta information 18 since the agent will be able to read the uncommitted authorizations from the system catalog tables 10. After updating the cumulative delta information 18, the cache entry state will be NOT_LOADED_RSVD.

When the cache entry state is VALID_RSVD and an application seeks to read the authorization information 16, the reading application will test to determine if it holds the loading lock (i.e. whether it was the application that issued the GRANT that put the cache entry 15 into the reserved state). If the lock is held by the reading application, the cumulative delta bitmap information 18 will be provided in response to the read. If the lock is held by another application then the authorization bitmap 16 will be used.

When the cache entry state is NOT_LOADED_RSVD and an application seeks to read the authorization information 16, the reading application will test to determine if it holds the loading lock. If the lock is held by the reading application, the cumulative delta bitmap information 18 will be provided in response to the read. If the lock is held by another application then the reading application will be required to wait on the loading lock.

In general, the operation of the preferred embodiment in response to a GRANT or a REVOKE statement is as follows: The execution of a GRANT or REVOKE statement will result in the lock of the appropriate rows in the system catalog tables 10 involved in the statement. If cache entries 15 exist, they will be locked (using a loading lock) and the status of the cache entries will be updated to a reserved status. A GRANT statement will put the entry 15 into VALID_RSVD state, and a REVOKE statement will put the cache entry 15 into a NOT_LOADED_RSVD state (this will force other agents to wait on the loading lock).

If authorizations are loaded in an existing cache entry 15, then they are copied to the cumulative delta bitmap 18 and the authorizations that are subject to the GRANT or REVOKE are applied to the cumulative delta bitmap 18 in the cache entry 15, not to the authorization bitmap 16. If a cache entry 15 does not exist, it will be created and the state for the cache entry will be set to NOT_LOADED_GRIP (i.e. grant/revoke in progress). In this state, it can only be loaded by the agent executing the GRANT or REVOKE statement, and it can only load the cumulative delta 18, therefore, for GRANT or REVOKE the state will be NOT_LOADED_RSVD.

Figure 2:
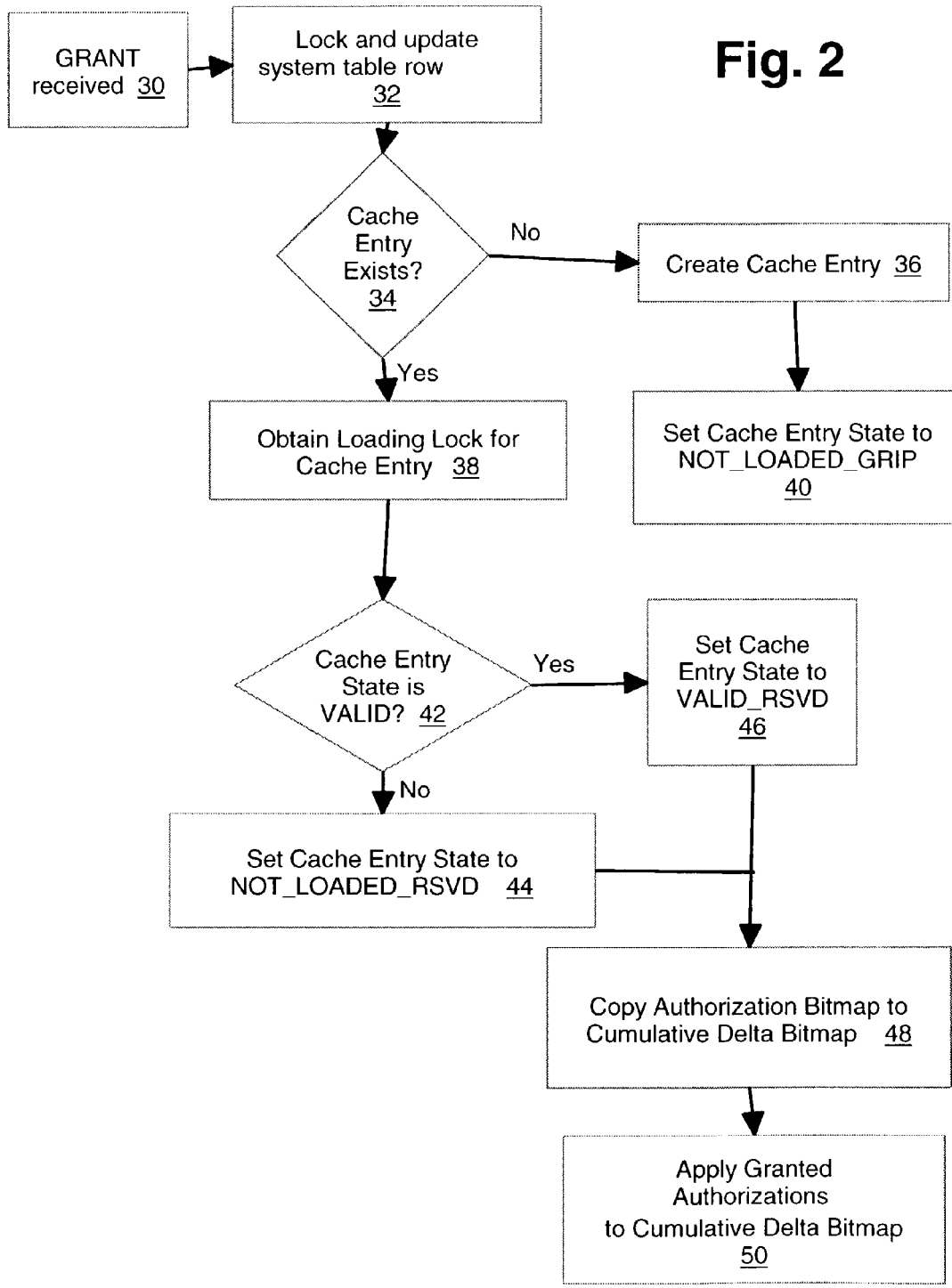
FIG. 2 is a flowchart showing steps taken in the preferred embodiment after a GRANT request is received from an application.

FIG. 2 is a flowchart showing selected steps carried out as the result of a GRANT operation request being executed by the system of the preferred embodiment. Box 30 shows the receipt by the database engine of a GRANT operation request from an application. The GRANT operation will relate to certain rows in the database tables that are locked and updated as indicated in box 32. The system determines whether a cache entry 15 exists for the relevant row in decision box 34. If no, then as shown in boxes 36, 40, a cache entry 15 is created and the cache entry state is set to be NOT_LOADED_GRIP.

If the cache entry 15 does exist, box 38 shows that the system obtains a loading lock for the cache entry 15. If the cache entry 15 state is VALID (decision box 42), then the cache entry state is set to VALID_RSVD (box 46). If not, the cache entry state is set to NOT_LOADED_RSVD (box 44). Authorizations are copied to cumulative delta 18 (box 48) and the GRANT operation authorizations are applied (box 50).

The approach of the preferred embodiment allows, in the case of a GRANT operation, continued access to the unmodified (uncommitted) authorization information 16 while maintaining the exclusive control and private view of the authorization information that is required by the issuer of the GRANT or REVOKE statement. Because the cumulative delta bitmap information 18 is stored in the cache entry 15 itself, in the preferred embodiment, on the commit of the maintenance unit of work the cached entry 15 may be used, as modified by the cumulative delta bitmap 18. The cache entry 15 has the cumulative delta information 18 copied to the authorization bitmap 16, and the state set to VALID, on the commit. This will avoid a catalog 10 access.

It should be noted that as indicated above, a single cache entry 15 may contain authorization information for multiple catalog rows that have been consolidated, as described. Without the cumulative delta information 18 in the cache entry 15, there may be reduced concurrency in comparison with access to the rows that are in the catalog table 10. For instance, the execution of a GRANT statement will have the effect of locking the appropriate row in the system catalog tables 10 that matches the GRANTOR, GRANTEE, and GRANTEETYPE of the GRANT statement. However, in the cache entry 15 in the preferred embodiment, there is only GRANTEE, GRANTEETYPE available to identify the cache entry 15 and therefore the lock on the cache entry 15 will effectively lock more information from use by other agents. By employing the cumulative delta information 18, access to the authorization information in the cache 12 is more broadly available.

It will be appreciated that the preferred embodiment of the present invention is described with reference to an SQL database system, it will be appreciated that the present invention can be implemented for many types of database systems, and that the scope of the claims is not strictly limited to SQL database systems in particular.

Although a preferred embodiment of the present invention has been described here in detail, it will be appreciated by those skilled in the art that other variations may be made. Such variations may be made without departing from the spirit of the invention or the scope of the appended claims.

What is claimed is:

1. A method for improving access concurrency to information stored in at least one table in a relational database system comprising the steps of:
   (a) providing a data cache comprising a plurality of cache entries, wherein each cache entry comprises a first data item, a second data item, and a cache entry state identifier identifying a cache entry state;
   (b) retrieving from the at least one table and storing in a cache entry's first data item a representation of committed information for a user;
   (c) storing in the cache entry's second data item a representation of changes applied to the committed information, but not yet committed in the database system, wherein the changes are made by execution of one or more modify statements prior to the modify statements being committed in the database system;
   (d) receiving a request from an agent to access information in the cache entry; and
   (e) permitting the agent access to only one of the first data item and the second data item, wherein determining which one of the first data item and second data item is accessed is based on the cache entry state identifier and based on a type of a currently-executing modify statement separate from the request and configured to modify the information in the cache entry.

2. The method of claim 1, wherein permitting the agent access to only one of the first data item and the second data item is further based on whether the agent issued the currently-executing modify statement, and wherein the information changed by the modify statements and currently-executing modify statement is authorization information that governs user access to data in the relational database system.

3. The method of claim 2, wherein the permitting step (e) comprises:
   (e1) in response to the agent issuing the currently-executing modify statement to modify the information stored in the cache entry, allowing the agent access to the second data item.

4. The method of claim 2, wherein the type of the currently-executing modify statement is from a group comprising a grant statement and a revoke statement, and wherein the first data item represents the authorization information for the user, and the second data item represents changes applied to the authorization information made by the execution of at least one grant statement or at least one revoke statement prior to the at least one grant or revoke statement being committed in the database system, the at least one grant statement to allow access to data in the at least one table and the at least one revoke statement to restrict access to the data in the at least one table.

5. The method of claim 4, wherein the permitting step (e) comprises:
  (e1) allowing the agent access to the first data item in response to the agent not issuing the currently-executing modify statement to modify the authorization information stored in the cache entry, and the cache entry state indicating that the type of the currently-executing modify statement is a grant statement, and
  not allowing the agent access to the first second data item and the second data item until a lock on the cache entry is available to the agent, wherein the agent is not allowed access in response to the agent not issuing the currently-executing modify statement and the cache entry state indicating that the type of the currently-executing statement is a revoke statement.

6. The method of claim 4, wherein the cache entry state is one of a VALID, VALID_RSVD, NOT_LOADED, NOT_LOADED_RSVD, and NOT_LOADED_GRIP state.

7. The method of claim 4, wherein the first data item is a consolidated representation of authorization information for a grantee and grantee type pair stored in the at least one table in the database system.

8. The method of claim 1, wherein the first data item is a bitmap and the second data item is a bitmap.

9. The method of claim 2, wherein the database system is a SQL database system and the requesting database control statement is a SQL statement.

10. A non-transitory computer readable storage medium encoded with a computer program for improving access concurrency to information stored in at least one table in a relational database system, the computer program comprising instructions for:
  (a) providing a data cache comprising a plurality of cache entries, wherein each cache entry comprises a first data item, a second data item, and a cache entry state identifier identifying a cache entry state;
  (b) retrieving from the at least one table and storing in a cache entry's first data item a representation of committed information for a user;
  (c) storing in the cache entry's second data item a representation of changes applied to the committed information, but not yet committed in the database system, wherein changes are made by the execution of one or more modify statements prior to the modify statements being committed in the database system;
  (d) receiving a request from an agent to access information in the cache entry; and
  (e) permitting the agent access to only one of the first data item and the second data item, wherein determining which one of the first data item and second data item is accessed is based on the cache entry state identifier and based on a type of a currently-executing modify statement separate from the request and configured to modify the information in the cache entry.

11. The computer readable storage medium of claim 10, wherein the instruction of permitting the agent access to only one of the first data item and the second data item is further based on whether the agent issued the currently-executing modify statement, and wherein the information changed by the modify statements and currently-executing modify statement is authorization information that governs user access to data in the relational database system.

12. The computer readable storage medium of claim 11, wherein the permitting instruction (e) comprises:
  (e1) in response to the agent issuing the currently-executing modify statement to modify the information stored in the cache entry, allowing the agent access to the second data item.

13. The computer readable storage medium of claim 11, wherein the type of the currently-executing modify statement is from a group comprising a grant statement and a revoke statement, and wherein the first data item represents authorization information for the user, and the second data item represents changes applied to the authorization information made by the execution of at least one grant statement or at least one revoke statement prior to the at least one grant or revoke statement being committed in the database system, the at least one grant statement to allow access to data in the at least one table and the at least one revoke statement to restrict access to the data in the at least one table.

14. The computer readable storage medium of claim 13, wherein the permitting instruction (e) comprises:
  (e1) in response to the agent not issuing the currently-executing modify statement to modify the authorization information stored in the cache entry, and the cache entry state indicating that the type of the currently-executing modify statement is a grant statement, allowing the agent access to the first data item, and
  in response to the agent not issuing the currently-executing modify statement and the cache entry state indicating that the type of the currently-executing statement is a revoke statement, not allowing the agent access to the first second data item and the second data item until a lock on the cache entry is available to the agent.

15. The computer readable storage medium of claim 13, wherein the cache entry state is one of a VALID, VALID_RSVD, NOT_LOADED, NOT_LOADED_RSVD, and NOT_LOADED_GRIP state.

16. The computer readable storage medium of claim 13, wherein the first data item is a consolidated representation of authorization information for a grantee and grantee type pair stored in the at least one table in the database system.

17. The computer readable storage medium of claim 10, wherein the first data item is a bitmap and the second data item is a bitmap.

18. The computer readable storage medium of claim 11, wherein the database system is a SQL database system and the requesting database control statement is a SQL statement.

19. A system for increasing access concurrency in a relational database system comprising:
  a non-transitory computer readable storage medium accessible by a processor;
  at least one system catalog table in the database system and stored on the storage medium, wherein the at least one system catalog table comprises information for a plurality of users; and
  a data cache stored on the storage medium in communication with the database system for storing a portion of the at least one system catalog table, the data cache comprising a plurality of cache entries, wherein each cache entry represents information for a user by a first data item, a second data item, and a cache entry state identifier identifying a cache entry state, wherein the first data item represents committed authorization information for a user, and the second data item represents changes applied to the committed authorization information but not yet committed in the database system, the changes made by execution of at least one modify statement prior to the at least one modify statement being committed in the database system;

wherein a requesting agent is permitted access to only one of the first data item and the second data item, wherein determining which one of the first data item and second data item is accessed is based on the cache entry state identifier, based on a type of a currently-executing modify statement separate from the request and modifying the information in the cache entry, and based on whether the agent issued the currently-executing modify statement.

20. The system of claim 19, wherein the type of the currently-executing modify statement is from a group comprising a grant statement and a revoke statement, and wherein the first data item represents authorization information for the user, and the second data item represents changes applied to the authorization information made by the execution of at least one grant statement or at least one revoke statement prior to the at least one grant or revoke statement being committed in the database system, the at least one grant statement to allow access to data in the at least one table and the at least one revoke statement to restrict access to the data in the at least one table.

21. The system of claim 20, wherein the requesting agent is permitted access to the first data item in response to the agent not issuing the currently-executing modify statement and the cache entry state indicating that the type of the currently-executing modify statement is a grant statement, and wherein the requesting agent is not permitted access to the first and second data items until a lock on the cache entry is available to the agent, in response to the agent not issuing the currently-executing modify statement and the cache entry state indicating that the type of the currently-executing statement is a revoke statement.

22. The system of claim 21, wherein the cache entry state is one of a VALID, VALID_RSVD, NOT_LOADED, NOT_LOADED_RSVD, and NOT_LOADED_GRIP state.

23. The system of claim 21, wherein the first data item is a consolidated representation of authorization information for a grantee and grantee type pair stored in the at least one table in the database system.

24. The system of claim 19, wherein the first data item is a bitmap and the second data item is a bitmap.

25. The system of claim 19, wherein the database system is a SQL database system and the requesting database control statement is a SQL statement.

* * * * *